(12) United States Patent
Zhang et al.

(10) Patent No.: US 9,705,593 B2
(45) Date of Patent: Jul. 11, 2017

(54) COMMUNICATIONS DEVICE AND METHOD

(71) Applicant: Huawei Marine Networks Co., Ltd., Tianjin (CN)

(72) Inventors: Wendou Zhang, Shenzhen (CN); Changwu Xu, Beijing (CN)

(73) Assignee: Huawei Marine Networks Co., Ltd., Tianjin (CN)

( * ) Notice: Subject to any disclaimer, the term of this patent is extended or adjusted under 35 U.S.C. 154(b) by 2 days.

(21) Appl. No.: 14/799,418

(22) Filed: Jul. 14, 2015

(65) Prior Publication Data
US 2015/0318926 A1    Nov. 5, 2015

Related U.S. Application Data

(63) Continuation of application No. PCT/CN2013/070465, filed on Jan. 15, 2013.

(51) Int. Cl.
*H04B 10/077* (2013.01)
*H04B 10/035* (2013.01)
(Continued)

(52) U.S. Cl.
CPC ....... *H04B 10/0777* (2013.01); *H04B 10/035* (2013.01); *H04B 10/0779* (2013.01);
(Continued)

(58) Field of Classification Search
CPC . H04B 10/035; H04B 10/077–10/0799; H04B 10/2503; H04B 10/2918;
(Continued)

(56) References Cited

U.S. PATENT DOCUMENTS 5,058,101 A * 10/1991 Albanese ............... H04B 10/27
385/24
5,535,037 A * 7/1996 Yoneyama ........... H04B 10/035
398/177
(Continued)

FOREIGN PATENT DOCUMENTS

CN 1295742 A 5/2001
CN 1607748 A 4/2005
(Continued)

OTHER PUBLICATIONS

Murakami et al., "A Remote Supervisory System Based on Subcarrier Overmodulation for Submarine Optical Amplifier Systems," Journal of Lightwave Technology, vol. 14, Issue 5, pp. 671-677, Institute of Electrical and Electronics Engineers, New York, New York (May 1996).

*Primary Examiner* — David Payne
*Assistant Examiner* — Casey Kretzer
(74) *Attorney, Agent, or Firm* — Leydig, Voit & Mayer, Ltd.

(57) ABSTRACT

A communications device is disclosed and includes: a first acquiring unit for acquiring first specific wavelength light and second specific wavelength light from a first optical path; a first receiving unit for converting the first specific wavelength light coming from the first acquiring unit into a first electrical signal; a first control unit for sending a first modulating signal to a first loopback unit according to the first electrical signal coming from the first receiving unit; and the first loopback unit for modulating the second specific wavelength light coming from the first acquiring unit according to the first modulating signal, and looping the modulated second specific wavelength light back to a second optical path, where a transmission direction of an optical signal in the second optical path is opposite to a transmission
(Continued)

direction of an optical signal in the first optical path. The present invention further discloses a communications method.

9 Claims, 9 Drawing Sheets

(51) Int. Cl.
H04B 10/291 (2013.01)
H04B 10/80 (2013.01)
(52) U.S. Cl.
CPC ..... *H04B 10/2916* (2013.01); *H04B 10/2918* (2013.01); *H04B 10/80* (2013.01); *H04B 2210/078* (2013.01)
(58) Field of Classification Search
CPC ....... H04B 10/29–10/299; H04B 10/07; H04B 10/0777; H04B 10/80; H04J 14/0204–14/0205
See application file for complete search history.

(56) References Cited

U.S. PATENT DOCUMENTS

| | | | |
|---|---|---|---|
| 6,188,508 B1 | 2/2001 | Horiuchi et al. | |
| 6,404,527 B1 | 6/2002 | Jensen | |
| 6,414,775 B1 | 7/2002 | Pedersen | |
| 6,639,701 B1 | 10/2003 | Hirst | |
| 7,158,289 B1 | 1/2007 | Butler | |
| 7,340,164 B2 | 3/2008 | Charlet et al. | |
| 2003/0011855 A1* | 1/2003 | Fujiwara | H04B 10/0771 398/177 |
| 2003/0142976 A1 | 7/2003 | Evans et al. | |
| 2004/0136727 A1 | 7/2004 | Androni et al. | |
| 2004/0240884 A1* | 12/2004 | Gumaste | H04J 14/0204 398/59 |
| 2005/0069327 A1 | 3/2005 | Franck et al. | |
| 2005/0259264 A1* | 11/2005 | Munehira | H04B 10/0771 356/450 |
| 2009/0324219 A1* | 12/2009 | Jiang | H04J 14/0221 398/34 |
| 2009/0324231 A1 | 12/2009 | Nakano | |
| 2010/0329682 A1* | 12/2010 | Alexander | H04B 10/29 398/79 |
| 2011/0231568 A1 | 9/2011 | Bansal et al. | |
| 2012/0106964 A1* | 5/2012 | Sniezko | H04B 10/25751 398/67 |
| 2014/0086573 A1 | 3/2014 | Zhang et al. | |

FOREIGN PATENT DOCUMENTS

| | | |
|---|---|---|
| CN | 102176684 A | 9/2011 |
| CN | 102801464 A | 11/2012 |
| CN | 102804164 A | 11/2012 |
| EP | 0847158 A2 | 6/1998 |

* cited by examiner

Traffic wavelength light

COMMUNICATIONS DEVICE AND METHOD

CROSS-REFERENCE TO RELATED APPLICATIONS

This application is a continuation of International Patent Application No. PCT/CN2013/070465, filed on Jan. 15, 2013, which is hereby incorporated by reference in its entirety.

TECHNICAL FIELD

The present invention relates to the field of communications technologies, and in particular, to a communications device and method.

BACKGROUND

At present, a development trend of the submarine cable communications industry is that: communication between a terminal-station device and an underwater device, for example, communication between a terminal-station device and an underwater delay device or an underwater splitting device, needs to be implemented; therefore, a working state, a performance indicator, a fault situation, information about switching between an electric circuit and an optical circuit, and the like, that are of the underwater device are learned, so that network routing and switching, fault locating, fault processing and clearing, and the like are performed.

Referring to FIG. 1, FIG. 1 is a schematic diagram of communication between a terminal-station device and an underwater device. A terminal-station device 1a delivers a command (command signal) to at least one underwater device 1b, to notify the at least one underwater device 1b to receive the command and perform an action. After receiving the command, the selected underwater device 1b feeds back, according to a requirement of the terminal-station device 1a, device performance, a working state, whether to switch an electric circuit or optical circuit, and the like, thereby implementing intelligent monitoring between the terminal-station device 1a and the underwater device 1b.

Referring to FIG. 2, FIG. 2 is a structural diagram of an underwater device in the prior art. The underwater device shown in FIG. 2 uses a method of modulated optical output power, to implement communication with a terminal-station device.

As shown in FIG. 2, 20a is an uplink optical path, 40a is a downlink optical path, 23a is a pump unit, 21a is an erbium-doped fiber (EDF), 27a is an optical isolator, 25a is an optical multiplexer (wavelength division multiplexer), and 29a is a coupler. The bump unit 23a includes: 60a, which is a pump laser; 64a, which is a pump controller (pump controller); and 65a, which is a supervisory processor.

The underwater device shown in FIG. 2 enables, by adjusting the pump laser 60a, a peak modulation signal with respect to output power of an amplifier. Specifically, the pump controller 64a changes a working current of the pump laser 60a, and modulates output power of the pump laser 60a, to make input power of the erbium-doped fiber 21a change, thereby modulating output power of an optical amplifier, and implementing the modulated optical output power.

In the prior art, the output power of the pump laser 60a is modulated on a primary optical path, so as to implement modulated optical output power of an uplink optical path and a downlink optical path. The technical solution has the following disadvantages:

(1) Because the total power on the primary optical path is modulated, a service will be affected once a fault occurs, and service interruption may be caused in a serious situation, which does not meet a high reliability requirement of an underwater device; and (2) A special light emitting device, the pump laser 60a, is required, and the pump laser 60 is expensive and prone to damages, resulting in high costs and difficult maintenance.

SUMMARY

The present invention provides a communications device and a communications method, which can implement communication with a terminal-station device, without the need of separately providing a light source, service performance of communication can be effectively ensured.

According to a first aspect, a communications device is provided, where the communications device includes: a first acquiring unit, a first loopback unit, a first receiving unit, and a first control unit, where: the first acquiring unit is configured to acquire first specific wavelength light and second specific wavelength light from a first optical path; the first receiving unit is configured to convert the first specific wavelength light coming from the first acquiring unit into a first electrical signal; the first control unit is configured to send a first modulating signal to the first loopback unit according to the first electrical signal coming from the first receiving unit; and the first loopback unit is configured to modulate, according to the first modulating signal, the second specific wavelength light coming from the first acquiring unit, and loop the modulated second specific wavelength light back to a second optical path, where a transmission direction of an optical signal in the second optical path is opposite to a transmission direction of an optical signal in the first optical path.

In a first possible implementation manner of the first aspect, the first loopback unit includes a first modulating unit, a first modulation driving unit, and a first power combining unit, where: the first modulation driving unit is configured to generate a first driving signal according to the first modulating signal; the first modulating unit is configured to modulate the second specific wavelength light by using the first driving signal coming from the first modulation driving unit; and the first power combining unit is configured to couple the modulated second specific wavelength light to the second optical path.

With reference to any one of the foregoing possible implementation manners of the first aspect, in a second possible implementation manner of the first aspect, the first acquiring unit includes: a first power splitting unit, a first filtering unit, and a second power splitting unit, where: the first power splitting unit is configured to split part of light from the first optical path; the first filtering unit is configured to filter the part of light coming from the first power splitting unit, so as to obtain light having a specific wavelength; and the second power splitting unit is configured to split the light having a specific wavelength into the first specific wavelength light and the second specific wavelength light.

With reference to the first possible implementation manner of the first aspect, in a third possible implementation manner of the first aspect, the first acquiring unit includes: a third power splitting unit, a second filtering unit, a fourth power splitting unit, and a third filtering unit, where: an output end of the second filtering unit connects to the first receiving unit, and an output end of the third filtering unit connects to the first loopback unit; the third power splitting unit is configured to split part of light from the first optical path; the second filtering unit is configured to filter the part of light coming from the third power splitting unit, so as to obtain the first specific wavelength light; the fourth power splitting unit is configured to split part of light from the first optical path; and the third filtering unit is configured to filter the part of light coming from the fourth power splitting unit, so as to obtain the second specific wavelength light.

With reference to any one of the foregoing possible implementation manners of the first aspect, in a fourth possible implementation manner of the first aspect, the communications device further includes: a second acquiring unit, a second loopback unit, a second receiving unit, and a second control unit, where: the second acquiring unit is configured to acquire third specific wavelength light and fourth specific wavelength light from the second optical path; the second receiving unit is configured to convert the third specific wavelength light coming from the second acquiring unit into a second electrical signal; the second control unit is configured to send a second modulating signal to the second loopback unit according to the second electrical signal coming from the second receiving unit; and the second loopback unit is configured to modulate, according to the second modulating signal, the fourth specific wavelength light coming from the second acquiring unit, and loop the modulated fourth specific wavelength light back to the first optical path.

With reference to the fourth possible implementation manner of the first aspect, in a fifth possible implementation manner of the first aspect, the second loopback unit includes a second modulating unit, a second modulation driving unit, and a second power combining unit, where: the second modulation driving unit is configured to generate a second driving signal according to the second modulating signal; the second modulating unit is configured to modulate the second specific wavelength light by using the second driving signal coming from the first modulation driving unit; and the second power combining unit is configured to couple the modulated second specific wavelength light to the first optical path.

With reference to the fourth and fifth possible implementation manners of the first aspect, in a sixth possible implementation manner of the first aspect, the second acquiring unit includes: a fifth power splitting unit, a fourth filtering unit, and a sixth power splitting unit, where: the fifth power splitting unit is configured to split part of light from the second optical path; the fourth filtering unit is configured to filter the part of light coming from the fifth power splitting unit, so as to obtain light having a specific wavelength; and the sixth power splitting unit is configured to split the light having a specific wavelength into the third specific wavelength light and the fourth specific wavelength light.

With reference to the fourth and fifth possible implementation manners of the first aspect, in a seventh possible implementation manner of the first aspect, the second acquiring unit includes: a seventh power splitting unit, a fifth filtering unit, an eighth power splitting unit, and a sixth filtering unit, where: an output end of the fifth filtering unit connects to the second receiving unit, and an output end of the sixth filtering unit connects to the second loopback unit; the seventh power splitting unit is configured to split part of light from the second optical path; the fifth filtering unit is configured to filter the part of light coming from the seventh power splitting unit, so as to obtain the third specific wavelength light; the eighth power splitting unit is config- ured to split part of light from the second optical path; and the sixth filtering unit is configured to filter the part of light coming from the eighth power splitting unit, so as to obtain the fourth specific wavelength light.

According to a second aspect, a communications method is provided, where the method includes: acquiring first specific wavelength light and second specific wavelength light from a first optical path; converting the first specific wavelength light into a first electrical signal; generating a first modulating signal according to the first electrical signal; and modulating the second specific wavelength light according to the first modulating signal, and looping the modulated second specific wavelength light back to a second optical path, where a transmission direction of an optical signal in the second optical path is opposite to a transmission direction of an optical signal in the first optical path.

In a first possible implementation manner of the second aspect, the method further includes: acquiring third specific wavelength light and fourth specific wavelength light from the second optical path; converting the third specific wavelength light into a second electrical signal; generating a second modulating signal according to the second electrical signal; and modulating the fourth specific wavelength light according to the second modulating signal, and looping the modulated fourth specific wavelength light back to the first optical path.

According to the communications device and method provided by the embodiments of the present invention, a first acquiring unit acquires first specific wavelength light from a first optical path, and sends the first specific wavelength light to a first receiving unit; the first receiving unit converts the first specific wavelength light into a first electrical signal, and sends the first electrical signal to a first control unit, so as to implement a function of receiving a command by the communications device. When the communications device needs to respond to the command, a terminal-station device continuously sends an optical signal. The first acquiring unit acquires second specific wavelength light from the first optical path, and sends the second specific wavelength light to a first loopback unit; the first control unit parses the received first electrical signal, and sends a corresponding first modulating signal to the first loopback unit, so as to modulate the second specific wavelength light received from the first receiving unit, and generate a response signal, where the response signal is transmitted, along a second optical path, to the terminal-station device far away, which implements responding to a command signal by the communications device.

According to the communications device and method provided by the embodiments of the present invention, both the first receiving unit and the first control unit are disposed independently of the first optical path and the second optical path. Even if a fault occurs in the first optical path and the second optical path, a service on a primary optical path is not affected, which meets a high reliability requirement of a communications device, and ensures quality of a service signal; in addition, the communications device can implement responding to a command signal without requiring a separate light source, which saves costs and is easy to maintain.

BRIEF DESCRIPTION OF DRAWINGS

To describe the technical solutions in the embodiments of the present invention or in the prior art more clearly, the following briefly introduces the accompanying drawings required for describing the embodiments or the prior art.

Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention provides a communications device and a communications method, which can implement communication with a terminal-station device, without the need of separately providing a light source, service performance of communication can be effectively ensured.

In order to enable a person skilled in the art to better understand technical solutions in the embodiments of the present invention and make the foregoing objectives, features, and advantages of the embodiments of the present invention more comprehensible, the technical solutions in the embodiments of the present invention are further described in detail below with reference to the accompanying drawings.

Figure 1:
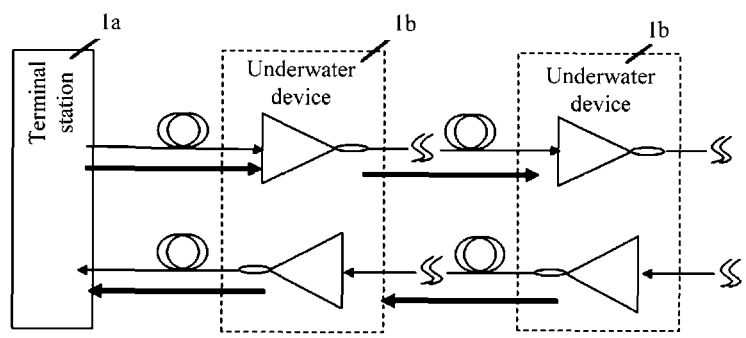
FIG. 1 is a schematic diagram of communication between a terminal-station device and an underwater device.
Figure 2:
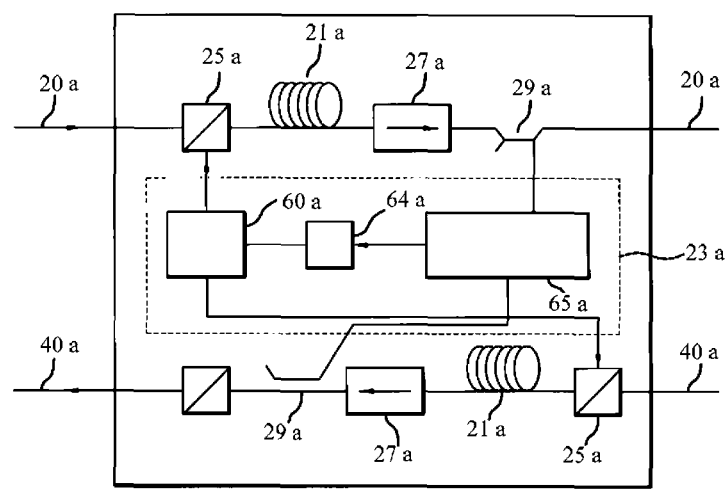
FIG. 2 is a structural diagram of an underwater device in the prior art.
Figure 3:
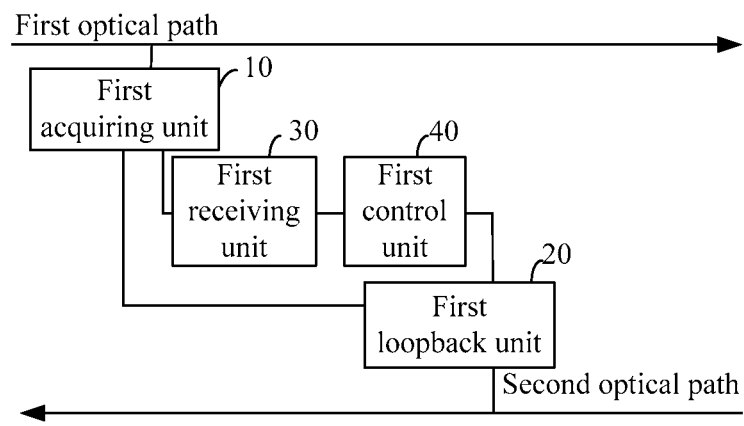
FIG. 3 is a structural diagram of a communications device according to Embodiment 1 of the present invention.

FIG. 3 is a structural diagram of a communications device according to Embodiment 1 of the present invention. As shown in FIG. 3, the communications device includes: a first acquiring unit 10, a first loopback unit 20, a first receiving unit 30, and a first control unit 40.

The first acquiring unit 10 is configured to acquire first specific wavelength light and second specific wavelength light from a first optical path.

The first receiving unit 30 is configured to convert the first specific wavelength light coming from the first acquiring unit 10 into a first electrical signal.

The first control unit 40 is configured to send a first modulating signal to the first loopback unit 20 according to the first electrical signal coming from the first receiving unit 10.

The first loopback unit 20 is configured to modulate, according to the first modulating signal, the second specific wavelength light coming from the first acquiring unit 10, and loop the modulated second specific wavelength light back to a second optical path, where a transmission direction of an optical signal in the second optical path is opposite to a transmission direction of an optical signal in the first optical path.

According to the communications device in Embodiment 1 of the present invention, a first acquiring unit 10 acquires first specific wavelength light from a first optical path, and sends the first specific wavelength light to a first receiving unit 30; the first receiving unit 30 converts the first specific wavelength light into a first electrical signal, and sends the first electrical signal to a first control unit 40, so as to implement a function of receiving a command by a communications device. When the communications device needs to respond to the command, a terminal-station device continuously sends light. The first acquiring unit 10 acquires second specific wavelength light from the first optical path, and sends the second specific wavelength light to a first loopback unit 20; the first control unit 40 parses the received first electrical signal, and sends a corresponding first modulating signal to the first loopback unit 20, so as to modulate the second specific wavelength light received from the first receiving unit 30, and generate a response signal, where the response signal is transmitted to, along a second optical path, to the terminal-station device far away, which implements responding to a command signal by the communications device.

According to the communications device in Embodiment 1 of the present invention, both the first receiving unit 30 and the first control unit 40 are disposed independently of the first optical path and the second optical path. Even if a fault occurs in the first optical path and the second optical path, a service on a primary optical path is not affected, which meets a high reliability requirement of a communications device, and ensures quality of a service signal; in addition, the communications device can implement responding to a command signal without requiring a separate light source, which saves costs and is easy to maintain.

In this embodiment of the present invention, wavelengths of the first specific wavelength light and the second specific wavelength light that are acquired by the first acquiring unit 10 from the first optical path may be the same, or may be different. The following separately describes in detail specific implementation manners of the communications device in the two cases.

Figure 4:
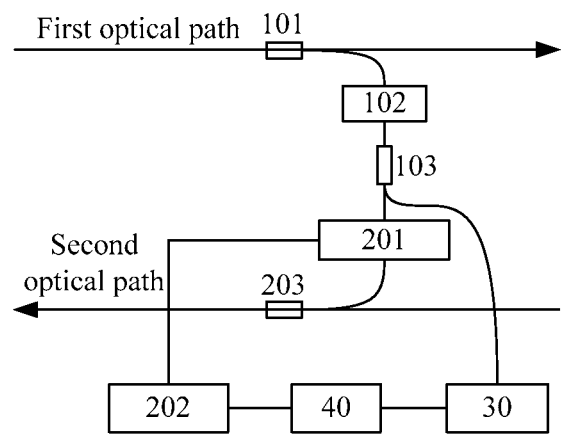
FIG. 4 is a structural diagram of a communications device according to Embodiment 2 of the present invention.

If the wavelength of the first specific wavelength light and the wavelength of the second specific wavelength light are the same, a specific implementation manner of the communications device may be shown in FIG. 4. FIG. 4 is a structural diagram of a communications device according to Embodiment 2 of the present invention.

As shown in FIG. 4, the first loopback unit 20 may include: a first modulating unit 201, a first modulation driving unit 202, and a first power combining unit 203.

The first modulation driving unit 202 is configured to generate a first driving signal according to the first modulating signal.

The first modulating unit 201 is configured to modulate the second specific wavelength light by using the first driving signal coming from the first modulation driving unit 202.

The first power combining unit 203 is configured to couple the modulated second specific wavelength light to the second optical path.

The first acquiring unit 10 may include: a first power splitting unit 101, a first filtering unit 102, and a second power splitting unit 103.

The first power splitting unit 101 is configured to split part of light from the first optical path.

The first filtering unit 102 is configured to filter the part of light coming from the first power splitting unit 101, so as to obtain light having a specific wavelength.

The second power splitting unit 103 is configured to split the light having a specific wavelength into the first specific wavelength light and the second specific wavelength light.

With reference to FIG. 4, it may be known that in Embodiment 2, both the first specific wavelength light and the second specific wavelength light are obtained by the first filtering unit 102 by filtering the part of light coming from the first power splitting unit 101, where the wavelength of the first specific wavelength light and the wavelength of the second specific wavelength light are the same, fall within a filtering bandwidth range of the first filtering unit 102, and are consistent with a central wavelength of the first filtering unit 102.

Figure 5:
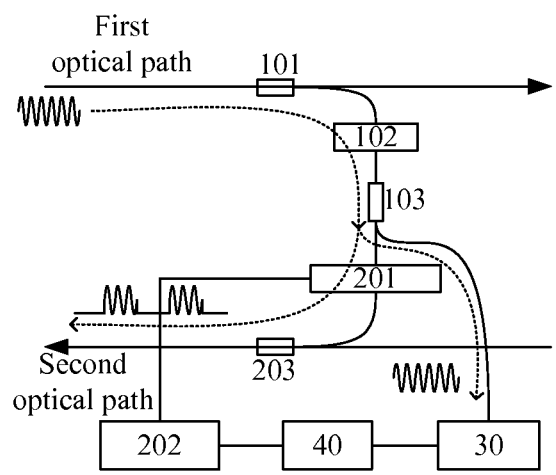
FIG. 5 is an information transfer diagram of receiving a command and responding to the command by a communications device according to Embodiment 2 of the present invention.

With reference to FIG. 4, the following describes in detail a working principle of the communications device in Embodiment 2 of the present invention. FIG. 5 is an information transfer diagram of receiving a command and responding to the command by a communications device according to Embodiment 2 of the present invention.

As shown in FIG. 5, a terminal-station device disposed far away sends light, where the light is transmitted to the communications device along a first optical path. The first acquiring unit 10 of the communications device acquires part of the light from the first optical path; the first filtering unit 102 filters the part of the light to obtain light having a specific wavelength; the second power splitting unit 103 splits, from the light having a specific wavelength, part of light as first specific wavelength light, and sends the first specific wavelength light to the first receiving unit 30; after performing conversion and amplifying processing on the first specific wavelength light, the first receiving unit 30 reports a command signal (that is, a first electrical signal) to the first control unit 40, thereby implementing a function of delivering a command by the terminal-station device and receiving the command by the communications device.

When the communications device needs to respond to the command, the terminal-station device continuously sends light. The second power splitting unit 103 splits, from the light having a specific wavelength, part of light as second specific wavelength light, and sends the second specific wavelength light to the first modulating unit 201 of the first loopback unit 20; in this case, the first control unit 40 parses the first electrical signal, and sends a corresponding first modulating signal to the first loopback unit 20; and the first modulation driving unit 202 in the first loopback unit 20 drives the first modulating unit 201 to modulate the second specific wavelength light, so as to generate a response signal (response signal). The response signal is transmitted, along a second optical path, to the terminal-station device far away, thereby implementing responding to the command signal by the communications device.

It should be noted that, when the communications device responds to the command, the light sent by the terminal-station device may be direct-current light without a modulating signal, or may be an optical signal with a modulating signal. If the light is an optical signal with a modulating signal, it is acceptable as long as the terminal-station device can distinguish a frequency of the optical signal from a modulating frequency of the first response signal. Specifically, if the light is an optical signal with a modulating signal, it is acceptable as long as a modulating frequency of the first modulating unit 201 is different from a modulating frequency of the modulating signal.

According to the communications device in Embodiment 2 of the present invention, both the first receiving unit 30 and the first control unit 40 are disposed independently of the first optical path and the second optical path. Even if a fault occurs in the first optical path and the second optical path, a service on a primary optical path is not affected, which meets a high reliability requirement of a communications device, and ensures quality of a service signal; in addition, the communications device can implement responding to a command signal without requiring a separate light source, which saves costs and is easy to maintain.

Figure 6A:
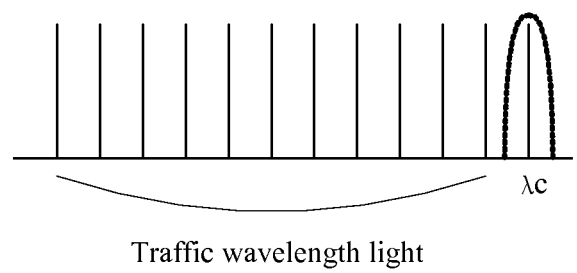
FIG. 6a is a spectrum diagram before an optical wave coming from a first optical path enters a first filter, and a curve diagram of filtering characteristics of a first filtering unit.
Figure 6B:
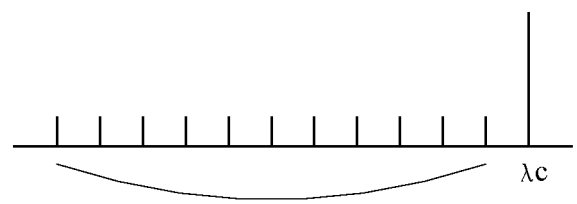
FIG. 6b is a spectrum diagram after an optical wave coming from a first optical path is filtered by a first filter.

In Embodiment 2 of the present invention, the first filtering unit 102 filters the part of light coming from the first power splitting unit 101, so as to obtain the light having a specific wavelength, that is, the first specific wavelength light and the second specific wavelength light. Therefore, wavelengths $\lambda c$ of both the first specific wavelength light and the second specific wavelength light are consistent with a wavelength $\lambda c$ of the central wavelength of the first filtering unit 102. FIG. 6a and FIG. 6b are diagrams of a working principle of the first filtering unit 102 according to this embodiment of the present invention. FIG. 6a is a spectrum diagram before an optical wave coming from the first optical path enters the first filtering unit and a curve diagram of filtering characteristics of the first filtering unit; FIG. 6c is a spectrum diagram after the optical wave is filtered by the first filtering unit.

As shown in FIG. 6a to FIG. 6c, before the optical wave enters the first filtering unit 102, in the spectrum diagram, there are traffic wavelength light (traffic light) and first specific wavelength light $\lambda c$ that is for monitoring. A dashed line in FIG. 6a shows a curve diagram of filtering characteristics of the first filtering unit 102, where a central wavelength of the first filtering unit 102 is also $\lambda c$, and 3 dB bandwidth of the first filtering unit 102 is less than a wavelength interval. In this way, after the light acquired by the first acquiring unit 10 from the first optical path undergoes filtering of the first filtering unit 102, all optical power of the traffic wavelength light in the spectrum diagram is almost filtered out, and only the first specific wavelength light that has a wavelength of $\lambda c$ and that is for monitoring remains.

It should be noted that, the first filtering unit 102 may be an optical band pass filter, or may be an optical film band pass filter, or another type of filter. Because the bandwidth of the first filtering unit 102 is less than the wavelength interval, a narrowband filter may be preferentially selected for the first filtering unit 102.

Figure 7A:
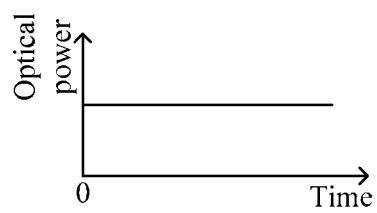
FIG. 7a is a schematic diagram of optical power before second specific wavelength light enters a first modulator.
Figure 7B:
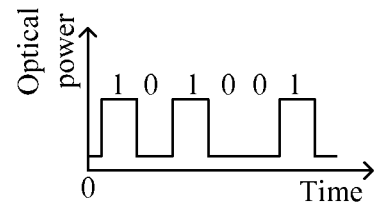
FIG. 7b is a schematic diagram of optical power after second specific wavelength light is modulated by a first modulator.

In this embodiment of the present invention, the first modulating unit 201 can implement modulation of specific wavelength light. FIG. 7a and FIG. 7b are diagrams of a modulation principle of the first modulating unit. FIG. 7a is a waveform diagram of an optical signal before second specific wavelength light enters the first modulating unit; and FIG. 7b is a waveform diagram of an optical signal after the second specific wavelength light is modulated by the first modulating unit.

As shown in FIG. 7a to FIG. 7b, light with constant power is input into the first modulating unit 201; and the first modulating unit 201 modulates the received light according to control information (101001) sent by a driver, and outputs an optical signal including the 101001 information.

It should be noted that, the light received by the first modulating unit 201 may be direct-current light (as shown in FIG. 7a) without a modulating signal, or may be an optical signal with a modulating signal. If the light is an optical signal with a modulating signal, it is acceptable as long as a modulating frequency of the first modulating unit 201 is different from a modulating frequency of the modulating signal. It should be noted that, the first modulating unit 201 may be an optical switch (optical switch), for example, an optical switch OFMS11MPSNZAB05 from a manufacturer oplink; or may be a lithium niobate modulator (lithium niobate modulator), for example, a D0069-SN modulator from a manufacturer OCLARO.

Figure 8:
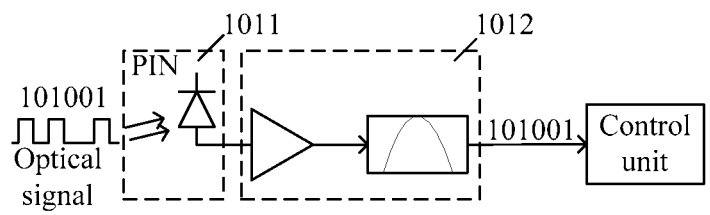
FIG. 8 is a structural diagram of a first receiving unit according to Embodiment 2 of the present invention.

In this embodiment of the present invention, the first receiving unit 10 may include: a PIN diode 1011 and a receiver circuit 1012. FIG. 8 is a structural diagram of a first receiving unit according to Embodiment 2 of the present invention.

The PIN diode may specifically be a photodiode. The receiver circuit 1012 includes an amplifier and a filter.

The photodiode receives an optical signal of the specific wavelength light, for example, the optical signal 101001 shown in FIG. 8, where the optical signal 101001 is converted into an electrical signal, and sent to the amplifier. After the electrical signal is amplified by the amplifier, noise is then filtered out by the filter, and an electrical signal (101001) with better quality is output as a command signal to the first control unit 40.

Figure 9:
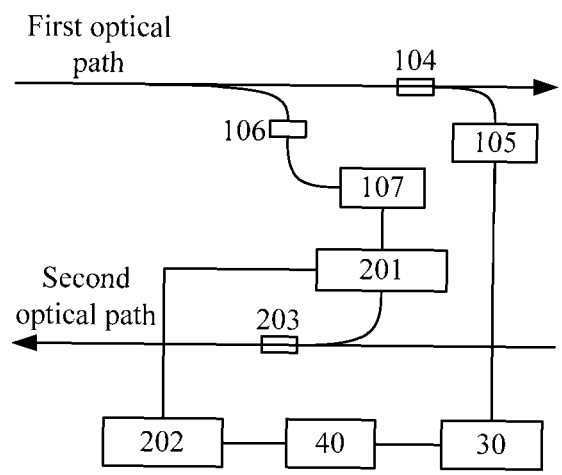
FIG. 9 is a structural diagram of a communications device according to Embodiment 3 of the present invention.

If the wavelength of the first specific wavelength light and the wavelength of the second specific wavelength light are different, a specific implementation manner of the communications device may be shown in FIG. 9. FIG. 9 is a structural diagram of a communications device according to Embodiment 3 of the present invention.

A difference between the communications device of Embodiment 3 shown in FIG. 9 and the communications device of Embodiment 2 shown in FIG. 4 lies in that: the first acquiring unit 10 includes: a third power splitting unit 104, a second filtering unit 105, a fourth power splitting unit 106, and a third filtering unit 107.

An output end of the second filtering unit 105 connects to the first receiving unit 30, and an output end of the third filtering unit 107 connects to the first loopback unit 20.

The third power splitting unit 104 is configured to split part of light from the first optical path.

The second filtering unit 105 is configured to filter the part of light coming from the third power splitting unit 104, so as to obtain the first specific wavelength light.

The fourth power splitting unit 106 is configured to split part of light from the first optical path.

The third filtering unit 107 is configured to filter the part of light coming from the fourth power splitting unit 106, so as to obtain the second specific wavelength light.

With reference to FIG. 9, the following describes in detail a working principle of the communications device in Embodiment 3 of the present invention. A terminal-station device disposed far away sends light, where the light is transmitted to the communications device along a first optical path. The third power splitting unit 104 of the first acquiring unit 10 of the communications device acquires part of the light from the first optical path; the second filtering unit 105 filters the part of the light to obtain the first specific wavelength light having a specific wavelength, and sends the first specific wavelength light to the first receiving unit 30; after performing conversion and amplifying processing on the first specific wavelength light, the first receiving unit 30 reports a command signal (that is, a first electrical signal) to the first control unit 40, thereby implementing a function of delivering a command by the terminal-station device and receiving the command by the communications device.

When the communications device needs to respond to the command, the terminal-station device continuously sends light. The fourth power splitting unit 106 acquires part of the light from the first optical path; the second filtering unit 105 filters the part of the light to obtain the second specific wavelength light having a specific wavelength, and sends the second specific wavelength light to a first modulating unit 201 of the first loopback unit 20; in this case, the first control unit 40 parses the first electrical signal, and sends a corresponding first modulating signal to the first loopback unit 20; and a first modulation driving unit 202 in the first loopback unit 20 drives the first modulating unit 201 to modulate the second specific wavelength light, so as to generate a response signal (response signal). The response signal is transmitted, along a second optical path, to the terminal-station device far away, thereby implementing responding to the command signal by the communications device.

According to the communications device in Embodiment 2 of the present invention, both the first receiving unit 30 and the first control unit 40 are disposed independently of the first optical path and the second optical path. Even if a fault occurs in the first optical path and the second optical path, a service on a primary optical path is not affected, which meets a high reliability requirement of a communications device, and ensures quality of a service signal; in addition, the communications device can implement responding to a command signal without requiring a separate light source, which saves costs and is easy to maintain.

In Embodiment 3 of the present invention, the wavelength of the first specific wavelength light is consistent with a central wavelength of the second filtering unit 105, and is used for filtering out other non-first specific wavelength light. The wavelength of the second specific wavelength light is consistent with a central wavelength of the third filtering unit 107, and is used for filtering out other non-second specific wavelength light.

It should be noted that, the second filtering unit 105 and the third filtering unit 107 may be an optical band pass filter, or may be an optical film band pass filter (the optical film band pass filter), or another type of filter; and a narrowband filter may be preferentially selected.

The communications device in the foregoing embodiments of the present invention can implement receiving and responding to a command signal of a first optical path. In an actual application, the communications device not only needs to implement receiving and responding to a command signal of the first optical path, but also needs to implement receiving and responding to a command signal of the second optical path.

It should be noted that, according to the method of this embodiment of the present invention, a process in which the first receiving unit 30 receives the command signal of the first optical path and a process in which the first modulating unit 201 modulates the command signal may be performed at the same time, or may be performed in different periods of time.

If the two processes are performed in different periods of time, the receiving and responding to the command signal of the first optical path may be implemented in a time division multiplexing manner. Specifically, it may be that: in a first period of time T, the terminal-station device sends light with a modulating signal, and in this case, the communications device is configured to transmit a signal, where the first receiving unit 30 receives first specific wavelength light obtained by filtering by the second filtering unit 105, and reports a command signal to the first control unit 40 after performing conversion and amplifying processing on the first specific wavelength light; in a second period of time 2T, the terminal-station device sends light with constant power, and in this case, the communications device is configured to modulate a signal, where the first modulating unit 201 modulates second specific wavelength light according to the received first modulating signal to generate a response signal, and feeds the response signal back, along the second optical path, to the terminal-station device far away; in a third period of time 3T, the communications device is configured to transmit a signal; in a fourth period of time 4T, the communications device is configured to modulate a signal; and so on.

Figure 10:
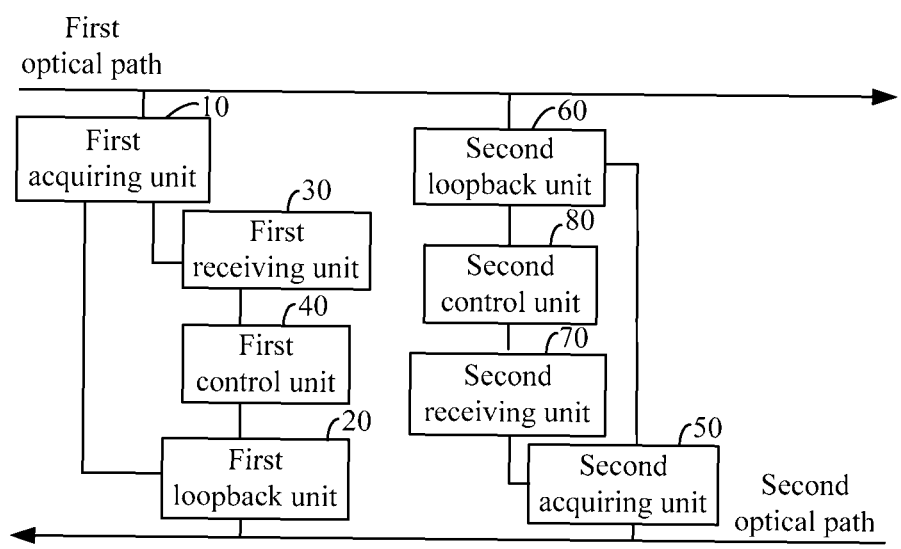
FIG. 10 is a structural diagram of a communications device according to Embodiment 4 of the present invention.

FIG. 10 is a structural diagram of a communications device according to Embodiment 4 of the present invention. The communications device in Embodiment 4 can implement receiving and responding to command signals of a first optical path and a second optical path at the same time. According to Embodiment 4 shown in FIG. 10, a main difference from the communications device in Embodiment 1 lies in that: the communications device further includes: a second acquiring unit 50, a second loopback unit 60, a second receiving unit 70, and a second control unit 80.

The second acquiring unit 50 is configured to acquire third specific wavelength light and fourth specific wavelength light from the second optical path.

The second receiving unit 70 is configured to convert the third specific wavelength light coming from the second acquiring unit 50 into a second electrical signal.

The second control unit 80 is configured to send a second modulating signal to the second loopback unit 60 according to the second electrical signal coming from the second receiving unit 70.

The second loopback unit 60 is configured to modulate, according to the second modulating signal, the fourth specific wavelength light coming from the second acquiring unit 50, and loop the modulated fourth specific wavelength light back to the first optical path.

A process in which the communications device in Embodiment 4 of the present invention implements receiving and responding to a command signal of the first optical path is the same as that in Embodiment 1, which is not described herein again.

A process in which the communications device implements receiving and responding to a command signal of the second optical path is specifically: the second acquiring unit 50 acquires the third specific wavelength light from the second optical path, and sends the third specific wavelength light to the second receiving unit 70; the second receiving unit 70 converts the third specific wavelength light into the second electrical signal, and sends the second electrical signal to the second control unit 80, so as to implement a function of receiving a command by the communications device. When the communications device needs to respond to the command, a terminal-station device continuously sends light. The second acquiring unit 50 acquires the fourth specific wavelength light from the second optical path, and sends the fourth specific wavelength light to the second loopback unit 60; the second control unit 80 parses the received second electrical signal, and sends a corresponding second modulating signal to the second loopback unit 60, so as to modulate the fourth specific wavelength light received from the second receiving unit 70, and generate a response signal, where the response signal is transmitted, along the first optical path, to the terminal-station device far away, which implements responding to a command signal by the communications device.

According to the communications device in Embodiment 4 of the present invention, the first receiving unit 30, the first control unit 40, the second receiving unit 70, and the second control unit 80 are disposed independently of the first optical path and the second optical path. Even if a fault occurs in the first optical path and the second optical path, a service on a primary optical path is not affected, which meets a high reliability requirement of a communications device, and ensures quality of a service signal; in addition, the communications device can implement responding to a command signal without requiring a separate light source, which saves costs and is easy to maintain.

It should be noted that in the communications device in Embodiment 4 of the present invention, both the first control unit 40 and the second control unit 80 are disposed independently. In another embodiment of the present invention, the first control unit 40 and the second control unit 80 may be integrated as a whole for implementation.

Figure 11:
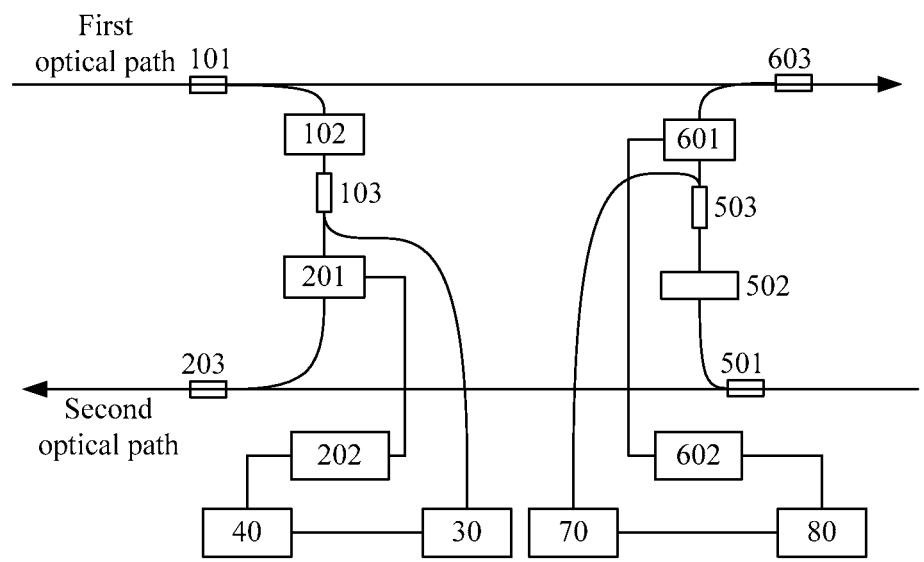
FIG. 11 is a structural diagram of a communications device according to Embodiment 5 of the present invention.

If a wavelength of the third specific wavelength light and a wavelength of the fourth specific wavelength light are the same, a specific implementation manner of the communications device may be shown in FIG. 11. FIG. 11 is a structural diagram of a communications device according to Embodiment 5 of the present invention.

As shown in FIG. 11, the second loopback unit 60 may include: a second modulating unit 601, a second modulation driving unit 602, and a second power combining unit 603.

The second modulation driving unit 602 is configured to generate a second driving signal according to the second modulating signal.

The second modulating unit 601 is configured to modulate the second specific wavelength light by using the second driving signal coming from the first modulation driving unit 602.

The second power combining unit 603 is configured to couple the modulated second specific wavelength light to the first optical path.

The second acquiring unit 50 may include: a fifth power splitting unit 501, a fourth filtering unit 502, and a sixth power splitting unit 503.

The fifth power splitting unit 501 is configured to split part of light from the second optical path.

The fourth filtering unit 502 is configured to filter the part of light coming from the fifth power splitting unit 501, so as to obtain light having a specific wavelength.

The sixth power splitting unit 503 is configured to split the light having a specific wavelength into the third specific wavelength light and the fourth specific wavelength light.

With reference to FIG. 11, it may be known that in Embodiment 5, both the third specific wavelength light and the fourth specific wavelength light are obtained by the fourth filtering unit 502 by filtering the part of light coming from the fifth power splitting unit 501, where the wavelength of the third specific wavelength light and the wavelength of the fourth specific wavelength light are the same, and fall within a filtering bandwidth range of the fourth filtering unit 502.

A process in which the communications device in Embodiment 5 of the present invention implements receiving and responding to a command signal of the first optical path is the same as that in Embodiment 1, which is not described herein again.

A process in which the communications device implements receiving and responding to a command signal of the second optical path is specifically: the terminal-station device disposed far away sends light, where the light is transmitted to the communications device along the second optical path. The second acquiring unit 50 of the communications device acquires part of the light from the second optical path; the fourth filtering unit 502 filters the part of the light to obtain light having a specific wavelength; the sixth power splitting unit 503 splits, from the light having a specific wavelength, part of light as third specific wavelength light, and sends the third specific wavelength light to the second receiving unit 70; after performing conversion and amplifying processing on the third specific wavelength light, the second receiving unit 70 reports a command signal (that is, a second electrical signal) to the second control unit 80, thereby implementing a function of delivering a command by the terminal-station device and receiving the command by the communications device.

When the communications device needs to respond to the command, the terminal-station device continuously sends light. The sixth power splitting unit 503 splits, from the light having a specific wavelength, part of light as fourth specific wavelength light, and sends the fourth specific wavelength light to the second modulating unit 601 of the second loopback unit 60; in this case, the second control unit 80 parses the second electrical signal, and sends a corresponding second modulating signal to the second loopback unit 60; and the second modulation driving unit 602 in the second loopback unit 60 drives the second modulating unit 601 to modulate the fourth specific wavelength light, so as to generate a response signal (response signal). The response signal is transmitted, along the first optical path, to the terminal-station device far away, thereby implementing responding to the command signal by the communications device.

According to the communications device in Embodiment 4 of the present invention, the first receiving unit 30, the first control unit 40, the second receiving unit 70, and the second control unit 80 are disposed independently of the first optical path and the second optical path. Even if a fault occurs in the first optical path and the second optical path, a service on a primary optical path is not affected, which meets a high reliability requirement of a communications device, and ensures quality of a service signal; in addition, the communications device can implement responding to a command signal without requiring a separate light source, which saves costs and is easy to maintain.

Figure 12:
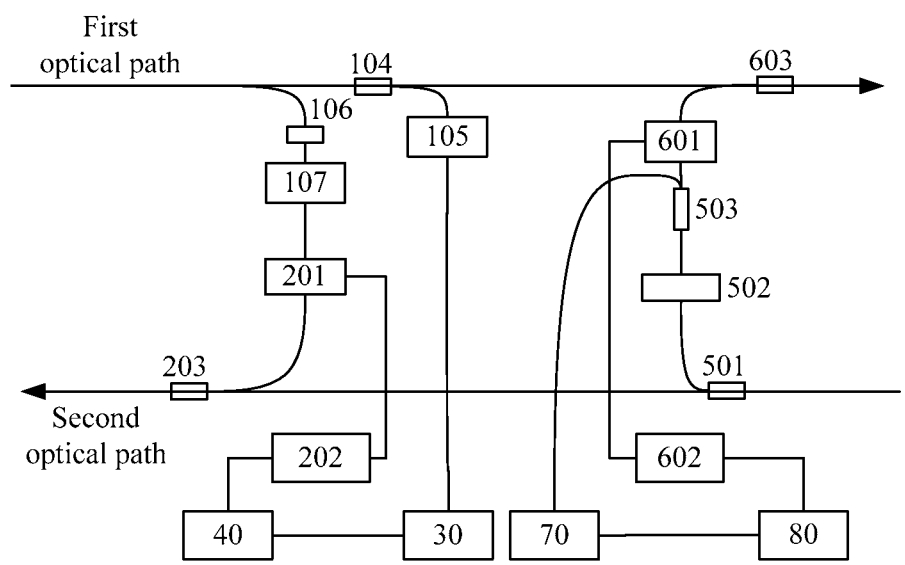
FIG. 12 is a structural diagram of a communications device according to Embodiment 6 of the present invention.

In Embodiment 5 shown in FIG. 11, a structure of the first acquiring unit 10 is the same as that in Embodiment 2 shown in FIG. 4, where the wavelength of the first specific wavelength light is equal to the wavelength of the second specific wavelength light. FIG. 12 is a structural diagram of a communications device according to Embodiment 6 of the present invention. A structure of the first acquiring unit 10 in Embodiment 6 is the same as that in Embodiment 3 shown in FIG. 9. A difference between the communications device in Embodiment 6 and that of Embodiment 5 lies in that: the wavelength of the first specific wavelength light is unequal to the wavelength of the second specific wavelength light.

Figure 13:
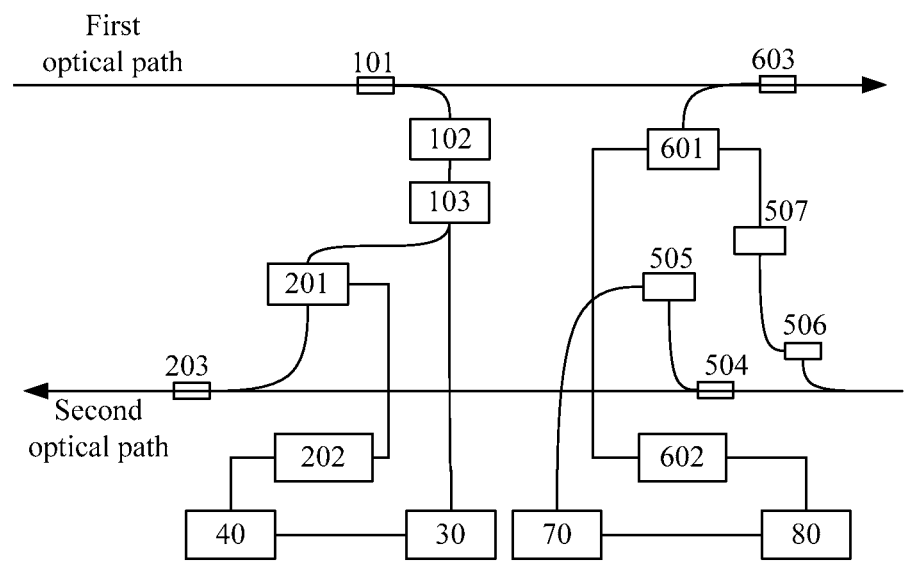
FIG. 13 is a structural diagram of a communications device according to Embodiment 7 of the present invention.

If the wavelength of the third specific wavelength light and the wavelength of the fourth specific wavelength light are different, a specific implementation manner of the communications device may be shown in FIG. 13. FIG. 13 is a structural diagram of a communications device according to Embodiment 7 of the present invention.

A difference between the communications device of Embodiment 7 shown in FIG. 13 and the communications device of Embodiment 5 shown in FIG. 11 lies in that: the second acquiring unit 50 includes: a seventh power splitting unit 504, a fifth filtering unit 505, an eighth power splitting unit 506, and a sixth filtering unit 507.

An output end of the fifth filtering unit 505 connects to the second receiving unit 70; and an output end of the sixth filtering unit 507 connects to the second loopback unit 60.

The seventh power splitting unit 504 is configured to split part of light from the second optical path.

The fifth filtering unit 505 is configured to filter the part of light coming from the seventh power splitting unit 504, so as to obtain the third specific wavelength light.

The eighth power splitting unit 506 is configured to split part of light from the second optical path.

The sixth filtering unit 507 is configured to filter the part of light coming from the eighth power splitting unit 506, so as to obtain the fourth specific wavelength light.

A process in which the communications device in Embodiment 7 of the present invention implements receiving and responding to a command signal of the first optical path is the same as that in Embodiment 1, which is not described herein again.

A process in which the communications device implements receiving and responding to a command signal of the second optical path is specifically: a terminal-station device disposed far away sends light, where the light is transmitted to the communications device along the second optical path. The seventh power splitting unit 504 of the second acquiring unit 50 of the communications device acquires part of the light from the second optical path; the fifth filtering unit 505 filters the part of the light to obtain the third specific wavelength light having a specific wavelength, and sends the third specific wavelength light to the second receiving unit 70; after performing conversion and amplifying processing on the third specific wavelength light, the second receiving unit 70 reports a command signal (that is, a second electrical signal) to the second control unit 80, thereby implementing a function of delivering a command by the terminal-station device and receiving the command by the communications device.

When the communications device needs to respond to the command, the terminal-station device continuously sends light. The eighth power splitting unit 506 acquires part of the light from the second optical path, the sixth filtering unit 507 filters the part of the light to obtain the fourth specific wavelength light having a specific wavelength, and sends the fourth specific wavelength light to the second modulating unit 601 of the second loopback unit 60; in this case, the second control unit 80 parses the second electrical signal, and sends a corresponding second modulating signal to the second loopback unit 60; and the second modulation driving unit 602 in the second loopback unit 60 drives the second modulating unit 601 to modulate the fourth specific wavelength light, so as to generate a response signal (response signal). The response signal is transmitted, along the first optical path, to the terminal-station device far away, thereby implementing responding to the command signal by the communications device.

Figure 14:
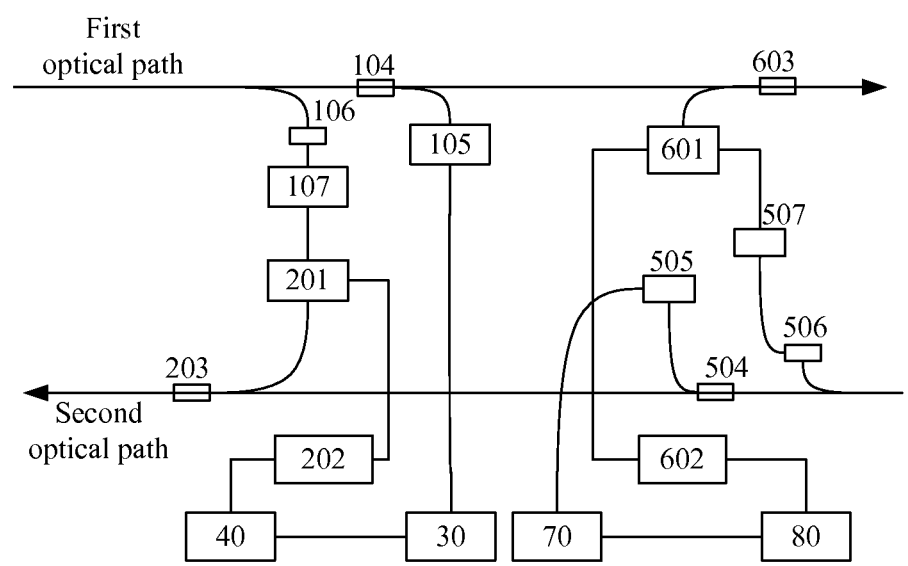
FIG. 14 is a structural diagram of a communications device according to Embodiment 8 of the present invention.

In Embodiment 7 shown in FIG. 13, a structure of the first acquiring unit 10 is the same as that in Embodiment 2 shown in FIG. 4, where the wavelength of the first specific wavelength light is equal to the wavelength of the second specific wavelength light. FIG. 14 is a structural diagram of a communications device according to Embodiment 8 of the present invention. A structure of the first acquiring unit 10 in Embodiment 8 is the same as that in Embodiment 3 shown in FIG. 9. A difference between the communications device in Embodiment 8 and that of Embodiment 7 lies in that: the wavelength of the first specific wavelength light is unequal to the wavelength of the second specific wavelength light.

Figure 15:
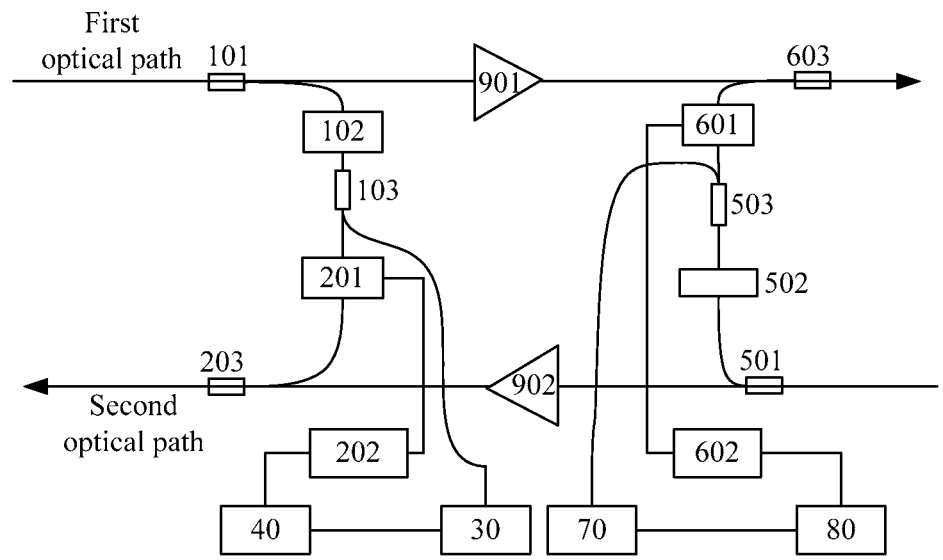
FIG. 15 is a structural diagram of a communications device according to Embodiment 9 of the present invention.

In an actual application, some communications devices need to have an amplifying function. Embodiment 9 of the present invention provides a communications device having an amplifying function. FIG. 15 is a structural diagram of a communications device according to Embodiment 9 of the present invention. A main difference from the communications device in Embodiment 5 shown in FIG. 11 lies in that: the communications device has the amplifying function, that is, an amplifier is connected in series separately in the first optical path and the second optical path of the communications device.

Specifically, as shown in FIG. 15, the communications device may further include: a first amplifier 901 and a second amplifier 902.

The first amplifier 901 is connected in series in the first optical path, where an input end of the first amplifier 901 connects to the first power splitting unit 101, and an output end of the first amplifier 901 connects to the second power combining unit 603.

The second amplifier 902 is connected in series in the second optical path, where an input end of the second amplifier 902 connects to the fifth power splitting unit 501, and an output end of the second amplifier 902 connects to the first power combining unit 203.

Compared with Embodiment 5, an advantage of the communications device in Embodiment 9 lies in that: a signal with stronger power can be obtained after an uplink signal and a downlink signal are amplified by the first amplifier 901 and the second amplifier 902 respectively.

Figure 16:
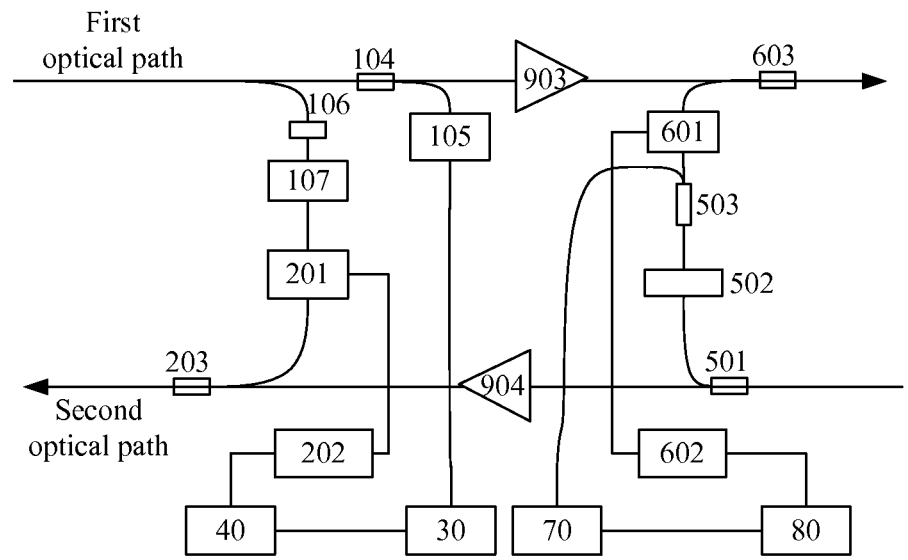
FIG. 16 is a structural diagram of a communications device according to Embodiment 10 of the present invention.

FIG. 16 is a structural diagram of a communications device according to Embodiment 10 of the present invention. A main difference from the communications device in Embodiment 6 shown in FIG. 12 lies in that: the communications device has the amplifying function, that is, an amplifier is connected in series separately in the first optical path and the second optical path of the communications device.

Specifically, as shown in FIG. 16, the communications device may further include: a third amplifier 903 and a fourth amplifier 904.

The third amplifier 903 is connected in series in the first optical path, where an input end of the third amplifier 903 connects to the third power splitting unit 104, and an output end of the third amplifier 903 connects to the second power combining unit 603.

The fourth amplifier 904 is connected in series in the second optical path, where an input end of the fourth amplifier 904 connects to the fifth power splitting unit 501, and an output end of the fourth amplifier 904 connects to the first power combining unit 203.

Compared with Embodiment 6, an advantage of the communications device in Embodiment 10 lies in that: a signal with stronger power can be obtained after an uplink signal and a downlink signal are amplified by the first amplifier 903 and the second amplifier 904 respectively.

Certainly, in Embodiment 7 shown in FIG. 13 and in Embodiment 8 shown in FIG. 14, an amplifier may also be connected in series separately in the first optical path and the second optical path. A method for connecting the amplifier in series is the same as that in the foregoing embodiment, which is not described herein again.

Figure 17:
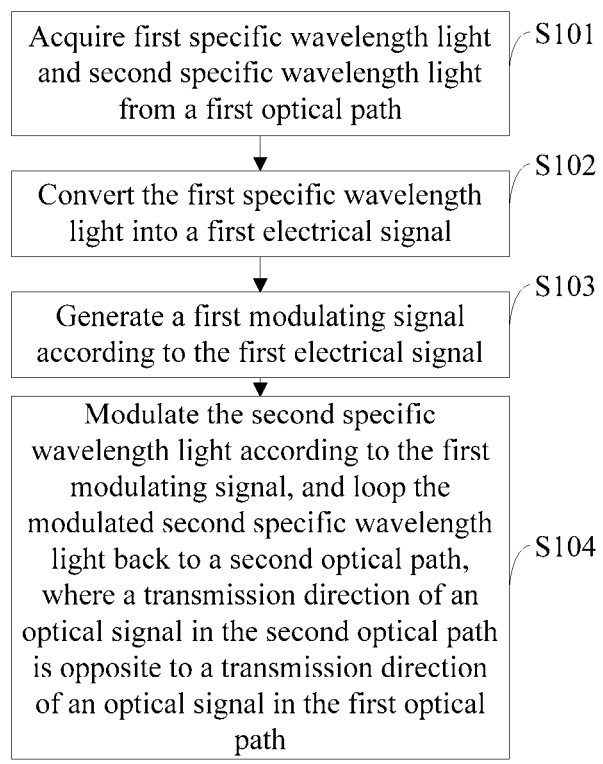
FIG. 17 is a flowchart of a communications method according to an embodiment of the present invention.

Corresponding to the communications device provided by the embodiments of the present invention, an embodiment of the present invention further provides a communications method. FIG. 17 is a flowchart of a communications method according to Embodiment 1 of the present invention. As shown in FIG. 17, the method may include:

Step S101: Acquire first specific wavelength light and second specific wavelength light from a first optical path.

Step S102: Convert the first specific wavelength light into a first electrical signal.

Step S103: Generate a first modulating signal according to the first electrical signal.

Step S104: Modulate the second specific wavelength light according to the first modulating signal, and loop the modulated second specific wavelength light back to a second optical path, where a transmission direction of an optical signal in the second optical path is opposite to a transmission direction of an optical signal in the first optical path.

According to the communications method in this embodiment of the present invention, first specific wavelength light is acquired from a first optical path, and the first specific wavelength light is converted into a first electrical signal, thereby implementing a function of receiving a command; when the command needs to be responded to, second specific wavelength light is acquired from the first optical path, and the second specific wavelength light is modulated according to the received first electrical signal, to generate a response signal, where the response signal is transmitted, along a second optical path, to a terminal-station device far away, so as to implement responding to the command signal.

According to the communications method in this embodiment of the present invention, a process in which the first modulating signal is generated according to the first specific wavelength light to modulate the second specific wavelength light is performed independently of the first optical path and the second optical path. Even if a fault occurs in the modulating process, a service on a primary optical path is not affected, which meets a high reliability requirement of communications, and ensures quality of a service signal; in addition, in the communications method, responding to the command signal can be implemented without requiring a separate light source, which saves costs and is easy to maintain.

By using the method in Embodiment 1 of the present invention, receiving and responding to a command signal of the first optical path can be implemented. In an actual application, not only the receiving and responding to the command signal of the first optical path needs to be implemented, but also receiving and responding to a command signal of the second optical path needs to be implemented.

Further, in order to implement the receiving and the responding to command signals of the first optical path and the second optical path at the same time, the method may further include:

Step S105: Acquire third specific wavelength light and fourth specific wavelength light from the second optical path.

Step S106: Convert the third specific wavelength light into a second electrical signal.

Step S107: Generate a second modulating signal according to the second electrical signal.

Step S108: Modulate the fourth specific wavelength light according to the second modulating signal, and loop the modulated fourth specific wavelength light back to the first optical path.

By using the method in Embodiment 2 of the present invention, receiving and responding to command signals of a first optical path and a second optical path can be implemented at the same time. In addition, according to the communications method in Embodiment 2 of the present invention, both a process in which the first modulating signal is generated according to the first specific wavelength light to modulate the second specific wavelength light and a process in which the second modulating signal is generated according to the third specific wavelength light to modulate the fourth specific wavelength light are performed independently of the first optical path and the second optical path. Even if a fault occurs in the modulating process, a service on a primary optical path is not affected, which meets a high reliability requirement of communications, and ensures quality of a service signal; in addition, in the communications method, responding to the command signal can be implemented without requiring a separate light source, which saves costs and is easy to maintain.

An embodiment of the present invention further provides a communications device. The communications device includes: a first acquiring apparatus, a first loopback apparatus, a first receiver, and a first controller.

The first acquiring apparatus is configured to acquire first specific wavelength light and second specific wavelength light from a first optical path.

The first receiver is configured to convert the first specific wavelength light coming from the first acquiring apparatus into a first electrical signal.

The first controller is configured to send a first modulating signal to the first loopback apparatus according to the first electrical signal coming from the first receiving apparatus.

The first loopback apparatus is configured to modulate, according to the first modulating signal, the second specific wavelength light coming from the first acquiring apparatus, and loop the modulated second specific wavelength light back to a second optical path, where a transmission direction of an optical signal in the second optical path is opposite to a transmission direction of an optical signal in the first optical path.

According to the communications device in this embodiment of the present invention, a first acquiring apparatus acquires first specific wavelength light from a first optical path, and sends the first specific wavelength light to a first receiver; the first receiver converts the first specific wavelength light into a first electrical signal, and sends the first electrical signal to a first controller, so as to implement a function of receiving a command by the communications device. When the communications device needs to respond to the command, a terminal-station device continuously sends an optical signal. The first acquiring apparatus acquires second specific wavelength light from the first optical path, and sends the second specific wavelength light to a first loopback apparatus; the first controller parses the received first electrical signal, and sends a corresponding first modulating signal to the first loopback apparatus, so as to modulate the second specific wavelength light received from the first receiver, and generate a response signal, where the response signal is transmitted, along a second optical path, to the terminal-station device far away, which implements responding to a command signal by the communications device.

According to the communications device in this embodiment of the present invention, both the first receiver and the first controller are disposed independently of the first optical path and the second optical path. Even if a fault occurs in the first optical path and the second optical path, a service on a primary optical path is not affected, which meets a high reliability requirement of a communications device, and ensures quality of a service signal; in addition, the communications device can implement responding to a command signal without requiring a separate light source, which saves costs and is easy to maintain.

Preferably, the first loopback apparatus may include: a first modulator, a first modulation driver, and a first power combiner.

The first modulation driver is configured to generate a first driving signal according to the first modulating signal.

The first modulator is configured to modulate the second specific wavelength light by using the first driving signal coming from the first modulation driver.

The first power combiner is configured to couple the modulated second specific wavelength light to the second optical path.

If a wavelength of the first specific wavelength light and a wavelength of the second specific wavelength light are the same, the first acquiring apparatus may include: a first power splitter, a first filter, and a second power splitter.

The first power splitter is configured to split part of light from the first optical path.

The first filter is configured to filter the part of light coming from the first power splitter, so as to obtain light having a specific wavelength.

The second power splitter is configured to split the light having a specific wavelength into the first specific wavelength light and the second specific wavelength light.

Both the first specific wavelength light and the second specific wavelength light are obtained by the first filter by filtering the part of light coming from the first power splitter, where the wavelength of the first specific wavelength light and the wavelength of the second specific wavelength light are the same, and are consistent with a central wavelength of the first filter.

If the wavelength of the first specific wavelength light and the wavelength of the second specific wavelength light are different, the first acquiring apparatus may include: a third power splitter, a second filter, a fourth power splitter, and a third filter.

An output end of the second filter connects to the first receiver; and an output end of the third filter connects to the first loopback apparatus.

The third power splitter is configured to split part of light from the first optical path.

The second filter is configured to filter the part of light coming from the third power splitter, so as to obtain the first specific wavelength light.

The fourth power splitter is configured to split part of light from the first optical path.

The third filter is configured to filter the part of light coming from the fourth power splitter, so as to obtain the second specific wavelength light.

The wavelength of the second specific wavelength light is consistent with a central wavelength of the second filter, and is used for filtering out other non-first specific wavelength light. The wavelength of the second specific wavelength light is consistent with a central wavelength of the third filter, and is used for filtering out other non-second specific wavelength light.

The communications device in the foregoing embodiment can implement receiving and responding to a command signal of a first optical path. In an actual application, the communications device not only needs to implement the receiving and the responding to the command signal of the first optical path, but also needs to implement receiving and responding to a command signal of a second optical path.

Preferably, the communications device may further include: a second acquiring apparatus, a second loopback apparatus, a second receiver, and a second controller.

The second acquiring apparatus is configured to acquire third specific wavelength light and fourth specific wavelength light from the second optical path.

The second receiver is configured to convert the third specific wavelength light coming from the second acquiring apparatus into a second electrical signal.

The second controller is configured to send a second modulating signal to the second loopback apparatus according to the second electrical signal coming from the second receiver.

The second loopback apparatus is configured to modulate, according to the second modulating signal, the fourth specific wavelength light coming from the second acquiring second, and loop the modulated fourth specific wavelength light back to the first optical path.

The communications device in the foregoing embodiment can implement receiving and responding to command signals of a first optical path and a second optical path at the same time.

Preferably, the second loopback apparatus may include: a second modulator, a second modulation driver, and a second power combiner.

The second modulation driver is configured to generate a second driving signal according to the second modulating signal.

The second modulator is configured to modulate the second specific wavelength light by using the second driving signal coming from the first modulation driver.

The second power combiner is configured to couple the modulated second specific wavelength light to the first optical path.

If a central wavelength of the third specific wavelength light and a central wavelength of the fourth specific wavelength light are the same, the second acquiring apparatus may include: a fifth power splitter, a fourth filter, and a sixth power splitter.

The fifth power splitter is configured to split part of light from the second optical path.

The fourth filter is configured to filter the part of light coming from the fifth power splitter, so as to obtain light having a specific wavelength.

The sixth power splitter is configured to split the light having a specific wavelength into the third specific wavelength light and the fourth specific wavelength light.

Both the third specific wavelength light and the fourth specific wavelength light are obtained by the fourth filter by filtering the part of light coming from the fifth power splitter, where the wavelength of the third specific wavelength light and the wavelength of the fourth specific wavelength light are the same, and are consistent with a central wavelength of the fourth filter.

If the wavelength of the third specific wavelength light and the wavelength of the fourth specific wavelength light are different, the second acquiring apparatus may include: a seventh power splitter, a fifth filter, an eighth power splitter, and a sixth filter.

An output end of the fifth filter connects to the second receiver; and an output end of the sixth filter connects to the second loopback apparatus.

The seventh power splitter is configured to split part of light from the second optical path.

The fifth filter is configured to filter the part of light coming from the seventh power splitter, so as to obtain the third specific wavelength light.

The eighth power splitter is configured to split part of light from the second optical path.

The sixth filter is configured to filter the part of light coming from the eighth power splitter, so as to obtain the fourth specific wavelength light.

The wavelength of the third specific wavelength light is consistent with a central wavelength of the fifth filter, and is used for filtering out other non-third specific wavelength light. The wavelength of the fourth specific wavelength light is consistent with the central wavelength of the fifth filter, and is used for filtering out other non-fourth specific wavelength light.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly; for related parts, reference may be made to partial descriptions in the method embodiment.

The foregoing descriptions are implementation manners of the present invention, but are not intended to limit the protection scope of the present invention. Any modification, equivalent replacement, and improvement made without departing from the spirit and principle of the present invention shall fall within the protection scope of the present invention.

The invention claimed is:

1. A communications device, wherein the communications device comprises:
   a first acquiring unit, configured to acquire light to be converted to an electrical signal and light to be modulated from a first optical path from a terminal-station device, wherein the terminal-station device is not underwater, wherein the communications device is underwater, and wherein the light to be converted to the electrical signal facilitates performance monitoring for the underwater communications device;
   a first receiving unit, configured to convert the acquired light to be converted to the electrical signal to a first electrical signal;
   a first control unit, configured to generate a first modulating signal according to the first electrical signal and send the first modulating signal to a first loopback unit; and
   the first loopback unit, configured to modulate, according to the first modulating signal, the acquired light to be modulated, and to loop the modulated light back to the terminal-station device through a second optical path, wherein a transmission direction corresponding to the second optical path is opposite to a transmission direction corresponding to the first optical path, and wherein the modulated light is used for carrying a performance monitoring result with respect to the underwater communications device;
wherein the first acquiring unit comprises: a first power splitting unit, a filtering unit, and a second power splitting unit;
wherein the first power splitting unit is configured to split light from the first optical wherein the filtering unit is configured to filter light from the first power splitting unit; and
wherein the second power splitting unit is configured to split the filtered light into the light to be converted to the electrical signal and the light to be modulated.

2. The communications device according to claim 1, wherein the first loopback unit comprises a modulating unit, a modulation driving unit, and a power combining unit;
wherein the modulation driving unit is configured to generate a first driving signal according to the first modulating signal;
wherein the modulating unit is configured to modulate the acquired light to be modulated by using the first driving signal; and
wherein the power combining unit is configured to couple the modulated light to the second optical path.

3. The communications device according to claim 1, wherein the communications device further comprises: a second acquiring unit, a second loopback unit, a second receiving unit, and a second control unit;
wherein the second acquiring unit is configured to acquire light to be converted to an electrical signal and light to be modulated from the second optical path;
wherein the second receiving unit is configured to convert the light to be converted to the electrical signal from the second acquiring unit into a second electrical signal;
wherein the second control unit is configured to send a second modulating signal to the second loopback unit according to the second electrical signal; and
wherein the second loopback unit is configured to modulate, according to the second modulating signal, the light to be modulated from the second acquiring unit, and loop the modulated light back to the first optical path.

4. The communications device according to claim 3, wherein the second loopback unit comprises a modulating unit, a modulation driving unit, and a power combining unit;
wherein the modulation driving unit is configured to generate a driving signal according to the second modulating signal;
wherein the modulating unit is configured to modulate the light to be modulated from the second acquiring unit by using the driving signal from the modulation driving unit; and
wherein the power combining unit is configured to couple the modulated light to the first optical path.

5. The communications device according to claim 3, wherein the second acquiring unit comprises: a first power splitting unit, a filtering unit, and a second power splitting unit;
wherein the first power splitting unit is configured to split light from the second optical path;
wherein the filtering unit is configured to filter the light from the first power splitting unit; and
wherein the second power splitting unit is configured to split the filtered light into the light to be converted to the electrical signal and the light to be modulated from the second optical path.

6. The communications device according to claim 3, wherein the second acquiring unit comprises: a first power splitting unit, a first filtering unit, a second power splitting unit, and a second filtering unit;
wherein an output end of the first filtering unit connects to the second receiving unit, and an output end of the second filtering unit connects to the second loopback unit;
wherein the first power splitting unit is configured to split light from the second optical path;
wherein the first filtering unit is configured to filter light from the seventh power splitting unit, so as to obtain the light to be converted to the electrical signal from the second optical path;
wherein the second power splitting unit is configured to split light from the second optical path; and
wherein the second filtering unit is configured to filter light from the second power splitting unit, so as to obtain the light to be modulated from the second optical path.

7. A communications method, wherein the method comprises:
acquiring, by an underwater communications device, light to be converted to an electrical signal and light to be modulated from a first optical path from a terminal-station device, wherein the terminal-station device is not underwater, and wherein the light to be converted to the electrical signal facilitates performance monitoring for the underwater communications device;
converting, by the underwater communications device, the light to be converted to the electrical signal into a first electrical signal;
generating, by the underwater communications device, a first modulating signal according to the first electrical signal; and
modulating, by the underwater communications device, the light to be modulated according to the first modulating signal, and looping the modulated light back to the terminal-station device through a second optical path, wherein a transmission direction corresponding to the second optical path is opposite to a transmission direction corresponding to the first optical path, and wherein the modulated light is used for carrying a performance monitoring result with respect to the underwater communications device;
wherein acquiring the light to be converted to the electrical signal and the light to be modulated from the first optical path from the terminal-station device further comprises:
splitting light from the first optical path;
filtering the light split from the first optical path; and
splitting the filtered light into the light to be converted to the electrical signal and the light to be modulated.

8. The method according to claim 7, wherein the method further comprises:
acquiring light to be converted to an electrical signal and light to be modulated from the second optical path;
converting the light to be converted to the electrical signal from the second optical path into a second electrical signal;
generating a second modulating signal according to the second electrical signal; and modulating the light to be modulated from the second optical path according to the second modulating signal, and looping the modulated light back to the first optical path.

9. A communications device, wherein the communications device comprises:
   a first acquiring unit, configured to acquire light to be converted to an electrical signal and light to be modulated from a first optical path from a terminal-station device, wherein the terminal-station device is not underwater, wherein the communications device is underwater, and wherein the light to be converted to the electrical signal facilitates performance monitoring for the underwater communications device;
   a first receiving unit, configured to convert the acquired light to be converted to the electrical signal to a first electrical signal;
   a first control unit, configured to generate a first modulating signal according to the first electrical signal and send the first modulating signal to a first loopback unit; and
   the first loopback unit, configured to modulate, according to the first modulating signal, the acquired light to be modulated, and to loop the modulated light back to the terminal-station device through a second optical path, wherein a transmission direction corresponding to the second optical path is opposite to a transmission direction corresponding to the first optical path, and wherein the modulated light is used for carrying a performance monitoring result with respect to the underwater communications device;
   wherein the first acquiring unit comprises: a first power splitting unit, a first filtering unit, a second power splitting unit, and a second filtering unit;
   wherein an output end of the first filtering unit connects to the first receiving unit, and an output end of the second filtering unit connects to the first loopback unit;
   wherein the first power splitting unit is configured to split light from the first optical path;
   wherein the first filtering unit is configured to filter the light from the first power splitting unit, so as to obtain the light to be converted to the electrical signal;
   wherein the second power splitting unit is configured to split light from the first optical path; and
   wherein the second filtering unit is configured to filter light from the second power splitting unit, so as to obtain the light to be modulated.

* * * * *